States & Lutts,
Lifting Gate,
N° 69,138.  Patented Sep. 24, 1867.
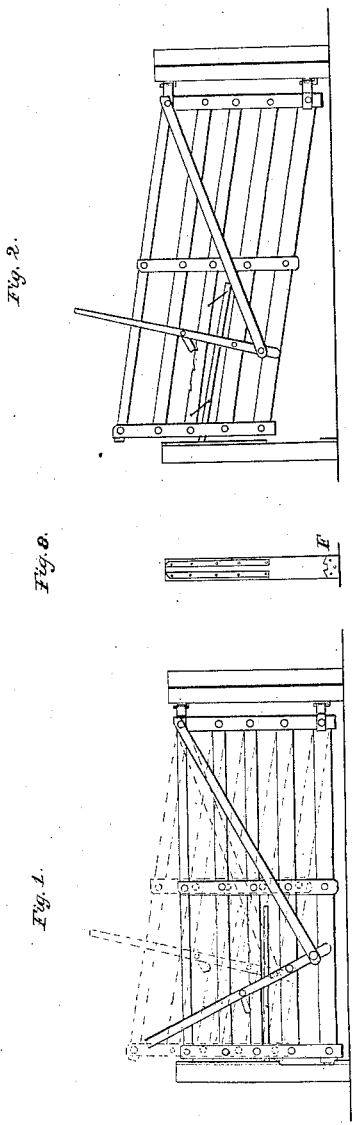
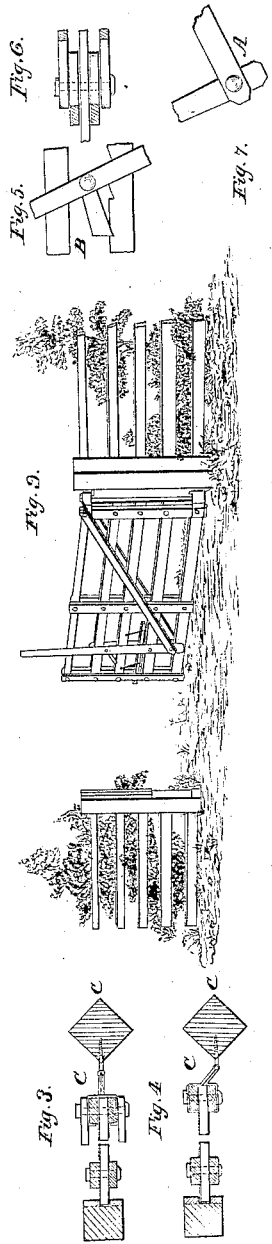
Witnesses
Geo. P. Roberts,
Chas F. Redfield.
Inventors:
Geo W. States.
Augustin W. Lutts.

United States Patent Office.

GEORGE W. STATES AND AUGUSTIN W. LUTTS, OF NORWALK, OHIO.

Letters Patent No. 69,138, dated September 24, 1867.

IMPROVEMENT IN FARM-GATES.

The Schedule referred to in these Letters Patent and making part of the same.

TO ALL WHOM IT MAY CONCERN:

Be it known that we, GEORGE W. STATES and AUGUSTIN W. LUTTS, both of the village of Norwalk, in the county of Huron, in the State of Ohio, have invented certain Improvements in the Mode of Constructing Farm-Gates; and we do hereby declare that the following is a full and exact description thereof, reference being had to the accompanying drawings, and the letters of reference marked thereon.

The nature of our improvement consists in the application of a lever power, which enables us to elevate the gate with greater ease, and certain other devices, whereby we secure greater strength and durability.

We construct our gates in any of the common forms, and apply a lever power, A, fig. 7, combined with the self-adjusting dog B, fig. 5; also the strap-hinge C, figs. 3 and 4, which prevents the cleat from splitting. We further claim the arrangement by which the lower bar rests in the notch F, fig. 8, thus sustaining the weight of the gate, preventing it from warping, and relieving the hinges from all strain when the gate is shut.

What we claim as improvements, and desire to secure by Letters Patent, is—

The manner of applying a lever, in combination with self-adjusting dog, to raise farm-gates with greater ease, and the device of the notch F and the hinges C, whereby we secure greater strength and durability.

GEORGE W. STATES,
AUGUSTIN W. LUTTS.

Witnesses:
GEO. P. ROBERTS,
CHAS. F. REDFIELD.